Figure 18:
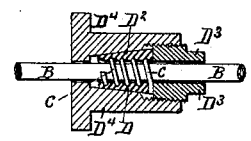

(No Model.) 2 Sheets—Sheet 1.
J. ROBERTSON.
APPARATUS FOR THE MANUFACTURE OF METAL TUBES.
No. 411,060. Patented Sept. 17, 1889.
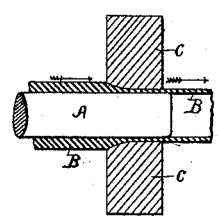
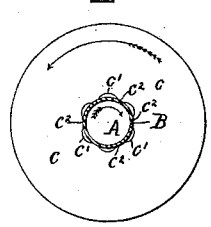
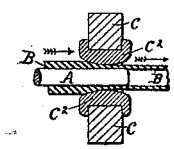
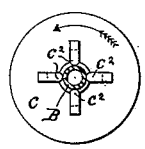
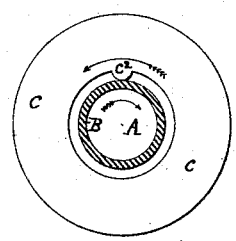
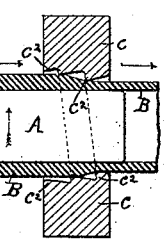
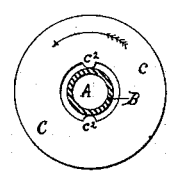
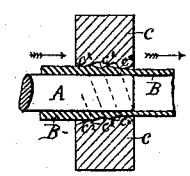
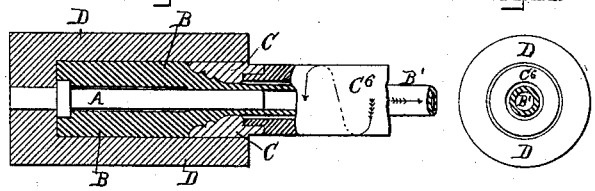
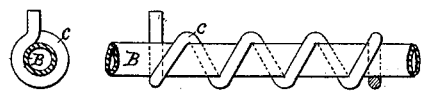
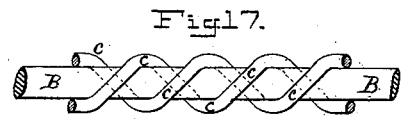
WITNESSES:
E. J. Griswold
John Revell
INVENTOR
James Robertson
BY
Howson and Howson
his ATTORNEYS.

(No Model.) 2 Sheets—Sheet 2.

J. ROBERTSON.
APPARATUS FOR THE MANUFACTURE OF METAL TUBES.

No. 411,060. Patented Sept. 17, 1889.

WITNESSES:
E. J. Griswold
John Revell

INVENTOR
James Robertson
BY
Howson and Howson
his ATTORNEYS

N. PETERS, Photo-Lithographer, Washington, D. C.

UNITED STATES PATENT OFFICE.

JAMES ROBERTSON, OF GLASGOW, COUNTY OF LANARK, SCOTLAND.

APPARATUS FOR THE MANUFACTURE OF METAL TUBES.

SPECIFICATION forming part of Letters Patent No. 411,060, dated September 17, 1889.

Application filed December 14, 1888. Serial No. 293,564. (No model.) Patented in England November 29, 1884, No. 15,752; in Germany September 17, 1885, No. 36,814; in France September 22, 1885, No. 171,280; in Belgium September 22, 1885, No. 70,282; in Italy August 13, 1886, No. 20,282, and in Austria-Hungary February 6, 1888, No. 35,813 and No. 65,481.

*To all whom it may concern:*

Be it known that I, JAMES ROBERTSON, a subject of the Queen of Great Britain and Ireland, and a resident of Glasgow, county of Lanark, Scotland, have invented certain Improvements in Apparatus for the Manufacture of Metal Tubes and Rods, (for which I have obtained Letters Patent in Great Britain, No. 15,752, dated November 29, 1884; Germany, No. 36,814, dated September 17, 1885; France, No. 171,280, dated September 22, 1885; Belgium, No. 70,282, dated September 22, 1885; Italy, No. 20,282, dated August 13, 1886, and Austria-Hungary, No. 35,813 and No. 65,481, dated February 6, 1888,) of which the following is a specification.

My invention consists of certain improvements in the construction of revolving dies and mandrels for the manufacture of metal tubes and rods by drawing and similar operations, as hereinafter described.

Figure 1 is a side sectional elevation, and Fig. 2 an end elevation, of one form of improved revolving die $c$, shown in a position for drawing, acting over a billet B, placed on a plain mandrel A, as indicated by the arrow placed upon the mandrel. The mandrel A is shown as being revolved in a reverse direction to the arrow on the die $c$; but this revolving die can also be used with advantage while the mandrel is held stationary, as mandrels are ordinarily when in use in draw-benches. The die is shown with six flutes or oil channel-ways $c'$ formed in it, and correspondingly-rounded acting edges $c^2$, shown between the oil or other lubricant channels. One oil-channel only may be used with advantage with corresponding rounded edges; but three channels for small diameters of tubes suit very advantageously, and one of the acting edges may be inserted and rendered easily adjustable to various diameters. In tubes of large diameters the revolving die is most advantageously constructed with all the acting tube-drawing-down edges fitted in separately.

Fig. 3 is a side sectional elevation, and Fig. 4 an external elevation, of a revolving die with four rounded-off acting edges $c^2$ fitted into corresponding slots into the body of the die. These hardened-steel edge-pieces are formed with gab ends to keep them in their seats, as seen in Fig. 3. They suit, within certain limits, a number of sizes or diameters of tubes, which may be formed by a die of this construction by inserting thin lining-pieces between these rounded acting edges and the body of the die, or the rounded acting edges $c^2$ $c^2$ can be easily rendered adjustable by cotters or screws or other mechanical means.

Fig. 5 is an end external elevation, and Fig. 6 a sectional side elevation, of a single-thread revolving die, with a metal billet B, to be drawn down into a thin tube, shown placed over a plain surface-mandrel A, Fig. 6 showing the form of the thread most generally suitable. The form of the thread shown is suitable for metals of about the degree of hardness and toughness of copper in a cold state. The acting edges of the thread or threads $c^2$ suit the best, to be of such a degree of inclination to the surface of the "shell" or thick tube operated upon that the thread of the revolving die will tend to draw the shell. It requires, notwithstanding this self-drawing-in action, a small degree of force to feed forward the shell, as with acute acting edges it requires troublesome draw-bench appliances to keep the billet B from going forward with the die too quickly, hard metals— such as steel—requiring the keenest and most acute gripping and drawing-down edges on the threads, as shown at $c^2$, and shaped more obtusely as the metal to be drawn is softer. Each successive thread in the die becomes practically a separate successive series of drawing-down dies, but for most metals four successive coils or series of threads is about the limit to obtain the greatest drawing effect, whether one or four successive threads are formed or cut in the die. The larger the diameter of the tube to be acted upon or drawn the greater the number of separate threads can be used with advantage. The depth of the dies to produce the best drawing effect should be about equal to the diameter of the tubes to be acted upon, and the mandrel may be revolved, and by preference in the reverse direction of the die, as indicated by the arrows; but it is most suitable and advantageous to use this die over a stationary mandrel or over a mandrel with only longitudinal motion.

Fig. 7 is an end elevation, and Fig. 8 a side sectional elevation, of a revolving die, with a shell B and mandrel shown placed in it with two threads instead of one thread, as in the one just described.

The same letters of reference refer to like parts.

Fig. 9 is a side sectional elevation, and Fig. 10 an end elevation, of a screw-die C, suited for soft metals—such as tin, lead, or zinc, or soft brass. The screw-die C is shown fitted on the point of a revolving hollow-stem rod or die ram $C^6$, and the billet B is cast hollow and placed over the mandrel A in a containing-cylinder D. The action of the die being a screwing-down action on the billet B under great pressure, and a portion of the die at the delivery end being left unscrewed and smooth, results in forcing out the tube B' through the hollow-die stem-rod $C^6$.

Fig. 11 is a side elevation, and Fig. 12 an end elevation, of a die of this description formed out of a piece of hardened and tempered steel and round wire $c$. When in its elongated state, as shown in Fig. 12, it is suitable for acting upon a tube B of smaller diameter. By compressing this spring-die $c$ until the coils of wire of which it is composed are brought together, it takes in a slightly larger diameter of tube. Fig. 13 is a side elevation, and Fig. 14 an end elevation, of the same die thus compressed on end and shown placed over a larger diameter of tube B.

Fig. 15 is a side sectional elevation, and Fig. 16 an end elevation, of a die of this kind formed out of a piece of flat bar and shown placed over a tube B.

Fig. 17 is a side elevation of a die $c$ of this description, shown composed of two wires and thereby having two threads, and in a like way to the single-thread die, within certain limits, also adjustable to any diameter of dies, and round, flat, or any other section of wire or bar with one or more threads can be easily constructed in large diameters. For some purposes six or more wires or threads can be used with advantage.

Figure 19:
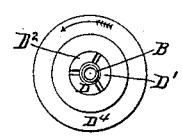

Fig. 18 is a side sectional elevation, and Fig. 19 an end elevation, of a single-threaded wire die of this description, shown placed in a suitable housing for adjusting the internal diameter of the die to the size required, and shown placed over a piece of tube B. The wire itself is shown placed in conical containing-blocks D, D', and $D^2$, composed of three pieces, (shown in end elevation in Fig. 19,) the adjusting-nut $D^3$ (shown in Fig. 18) being removed. These three conical separate pieces containing the wire die are shown inserted into a corresponding conical housing $D^4$, threaded at its outer end to receive the screw-nut $D^3$, which is made tubular for the passage of the tube. The outer end of this housing $D^4$ is made correspondingly tubular for the passage of the tube. By tightening up the nut $D^3$, as will be seen, the conical blocks D, D', and $D^2$, which do not occupy the full circumference of their seat, get forced down into their internal conical seat in the housing $D^4$, thereby compressing in the wire die externally and reducing its internal diameter, in like manner also enlarging the internal diameter of the die by screwing the nut $D^3$ outward.

Figure 20:
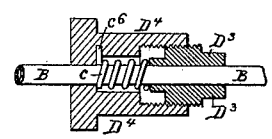
Figure 21:
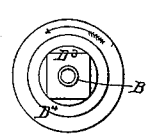

Fig. 20 is a side elevation, and Fig. 21 an external elevation, of another form of adjustable containing-housing for a similar spiral-wire die $c$. In this example the internal diameter of the die $c$ is smallest when the nut $D^3$ is farthest screwed out, and largest when this nut is screwed up until the coils of the wire come together, as explained in connection with Figs. 11, 12, 13, and 14. The projecting end $c^6$, which is placed in a slot in the housing $D^4$, prevents the wire die from running round in its housing. The third form of spiral-wire die placed in this form of housing is only suitable for light drawing, "floating," or polishing. The same action will take place when the tubes B are revolved. It is part of my invention to use this adjustable wire die in a stationary as well as a revolving state.

Referring to Figs. 1 to 21 of the dies described for drawing the tube-billets by acting specially on their outer circumference, it is to be understood that they are also applicable for the drawing and reducing of solid round bars, and desired to be claimed for that purpose also, in which case the internal mandrels and fittings connected therewith would not be required. On the other hand, in the manufacture of tubes an internal mandrel such as described and claimed in my application, Serial No. 243,619, filed July 7, 1887, may be combined with a revolving die of the construction hereinabove described.

Figure 22:
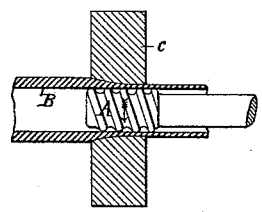
Figure 23:
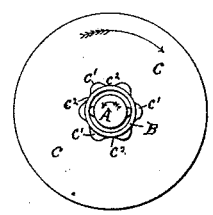

Fig. 22 is a side elevation, and Fig. 23 an end view, of a parallel screw-mandrel with six threads, shown with a shell B in section placed over it, and a fluted revolving die $c$, as described in connection with Figs. 1 and 2, is shown acting on the shell or tube externally.

Figure 24:
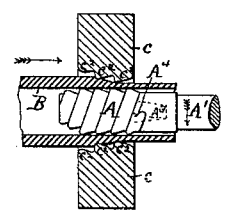
Figure 25:
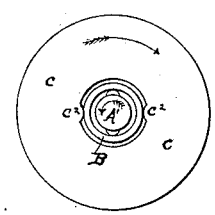

Fig. 24 is a side elevation, and Fig. 25 an end view, of a two-threaded screw-mandrel A, placed in a shell B, shown in section, and a two-threaded revolving screw-die—same as described in connection with Figs. 7 and 8—on the external surface of the shell or tube. The screw-threads of the die are cut to the same pitch and in the reverse direction to those of the mandrel and revolved in the reverse direction to the mandrel A. In large screw-mandrels it is most convenient, as in this example, to have the mandrel A in a separate steel piece from the stem A', and fixed by a round taper tang $A^3$, and formed with three or more claw-clutch projections $A^4$ on both mandrel and stem-rod to drive it round by its stem-rod A'.

Figure 26:
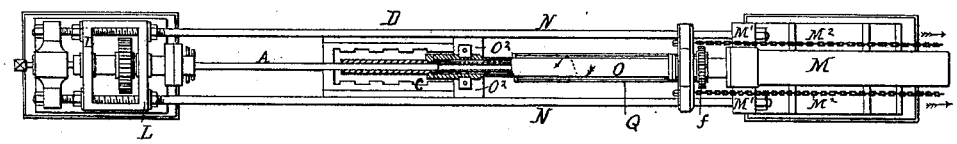

In Fig. 26 I have shown in plan view a machine in which my improved revolving dies may be applied and operated.

The mandrel A is shown as mounted in a head-stock L of any suitable construction; but in this instance longitudinal motion is not to be imparted to the mandrel, nor is rotary motion necessary to be imparted to it. The die c, however, has both a longitudinal and a rotary motion imparted to it to act on the tube or shell over the mandrel A. For this purpose the die is affixed to the end of a hollow steel rod O, which is attached to the revolving hydraulic ram. This ram works in the hydraulic cylinder M, and is mounted to turn at one end in a bearing in the sliding cross-head M', while at the other end it is mounted to turn in a bearing $O^2$ on the sliding block D. The cross-head M slides and is guided on the tie-rods N N, which connect the foundation of the hydraulic cylinder with the frame carrying the head-stock L. Behind the bearing in the cross-head M' the ram has fixed to it a cog wheel or pinion f, which is driven by an elongated toothed driving-drum Q below. Thus as the ram carrying the die is forced forward under the hydraulic pressure, it is at the same time continuously revolved to obtain the hereinabove-described action upon the metal. The mandrel A may be either held stationary or rotated in a reverse direction to the revolving die.

For the backing stroke of the hydraulic mechanism, chains $M^2$, secured to the cross-head M', may be attached to a separate hydraulic-cylinder ram or to a balance-weight, or otherwise, as is commonly done in such mechanism.

I claim as my invention—

1. The herein-described rotary die for drawing down metal tubes or rods, said die having internal rounded acting edges to displace or draw down the metal as the die is rotated and forced over the tube or rod, all substantially as described.

2. The herein-described rotary die for drawing down metal tubes or rods, said die having internal rounded acting edges with intermediate grooves for lubricating the acting edges, displacing or drawing down the metal as the die is rotated and forced over the tube or rod, all substantially as described.

3. The herein-described rotary die for drawing down metal tubes or rods, said die having internal rounded acting edges in the form of a screw thread or threads to displace or draw down the metal as the die is rotated and forced over the tube or rod, all substantially as described.

4. The combination of an internal mandrel for tubes with a rotary die having rounded acting edges to displace or draw down the metal of the exterior of the tube as the die is rotated and forced over the metal, all substantially as set forth.

5. The combination of an internal rotary mandrel, with rounded acting edges to form the interior of a tube, with a rotary die having rounded acting edges to displace or draw down the metal of the exterior of the tube, all substantially as described.

6. The combination of a rotary die, having rounded acting edges to draw down or displace the metal of the exterior of a rod or tube, with a hydraulic ram to force the die over the metal and means to rotate the die, all substantially as described.

7. The combination of a rotary die, having rounded acting edges to draw down or displace the metal of the exterior of a tube, with a mandrel for the interior of the tube, a hydraulic cylinder and ram carrying the die, and means for rotating the said ram, all substantially as described.

In testimony whereof I have signed my name to this specification in the presence of two subscribing witnesses.

JAMES ROBERTSON.

Witnesses:
WILLIAM LINDSAY,
WM. ROBERTSON.